(12) United States Patent
Zheng et al.

(10) Patent No.: US 9,948,910 B2
(45) Date of Patent: Apr. 17, 2018

(54) METHOD OF AND APPARATUS FOR SIMULTANEOUSLY DISPLAYING VIDEO INPUT ALONG WITH SUPPLEMENTARY INFORMATION

(71) Applicants: Jie Zheng, Plano, TX (US); Lei Zheng, Beijing (CN)

(72) Inventors: Jie Zheng, Plano, TX (US); Lei Zheng, Beijing (CN)

(*) Notice: Subject to any disclaimer, the term of this patent is extended or adjusted under 35 U.S.C. 154(b) by 0 days.

(21) Appl. No.: 15/449,035

(22) Filed: Mar. 3, 2017

(65) Prior Publication Data

US 2017/0374338 A1    Dec. 28, 2017

(30) Foreign Application Priority Data

Jun. 23, 2016   (CN) .......................... 2016 1 0461399

(51) Int. Cl.
| | |
|---|---|
| H04N 9/87 | (2006.01) |
| H04N 21/431 | (2011.01) |
| H04N 21/44 | (2011.01) |
| H04N 21/81 | (2011.01) |

(52) U.S. Cl.
CPC ....... *H04N 9/8715* (2013.01); *H04N 21/4316* (2013.01); *H04N 21/44016* (2013.01); *H04N 21/8153* (2013.01)

(58) Field of Classification Search
CPC ............. H04N 9/8715; H04N 21/4316; H04N 21/44016; H04N 21/8153
See application file for complete search history.

(56) References Cited

U.S. PATENT DOCUMENTS

| | | | |
|---|---|---|---|
| 2007/0208766 A1* | 9/2007 | Malik ................... | G11B 27/034 |
| 2010/0043046 A1* | 2/2010 | Sen ..................... | H04N 7/17318 725/133 |
| 2012/0163770 A1* | 6/2012 | Kaiser .............. | H04N 21/44016 386/241 |
| 2013/0283301 A1* | 10/2013 | Avedissian ....... | H04N 21/44016 725/5 |
| 2014/0033252 A1* | 1/2014 | Radloff .................. | H04N 5/445 725/35 |
| 2014/0140680 A1* | 5/2014 | Jo ........................ | H04N 9/8715 386/241 |

* cited by examiner

*Primary Examiner* — Hung Dang
*Assistant Examiner* — Sunghyoun Park
(74) *Attorney, Agent, or Firm* — Locke Lord LLP; Tim Tingkang Xia, Esq.

(57) ABSTRACT

One aspect of the invention includes an apparatus that simultaneously displays the video input and supplementary information, having a video overlay device, and a network management module, a removable storage device and a display device coupled to the video overlay device. The network management module includes a computer or a cloud server for uploading, via network, and controlling supplementary information. The video overlay device includes a central processing unit, and a video input processing unit, a video output processing unit and local memory coupled to the central processing unit. Under a control of the central processing unit, the supplementary information is obtained from the network management module, an email sent from the network management module, or removable storage devices, and is subsequently stored in the local memory, processed and displayed in a display device.

15 Claims, 2 Drawing Sheets

FIG. 2

METHOD OF AND APPARATUS FOR SIMULTANEOUSLY DISPLAYING VIDEO INPUT ALONG WITH SUPPLEMENTARY INFORMATION

CROSS-REFERENCE TO RELATED APPLICATION

This application claims the priority to Chinese Patent Application No. 201610461399.2 filed on Jun. 23, 2016 in the State Intellectual Property Office of P.R. China, which is hereby incorporated herein in its entirety by reference.

FIELD OF THE INVENTION

The present invention relates to the field of video display technology; in particular, to a method of and apparatus for simultaneously displaying the video input along with supplementary information.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Currently, projectors and other display devices have become indispensable visualization tools for classroom teaching, academic lectures, conference reports; through PowerPoint, people can display the information to be presented on a large-scale display device, such as projecting onto a large screen using a projector device.

In many professional conferences, there exist conference organizers, arrangers, sponsors, speakers, participants, and many other roles. The conference organizers will contact sponsors in order to obtain sponsorship fees to subsidize the costs of the conference. Here, sponsors may request that conference organizers visibly display the sponsors' information in the conference's content, such as in a PowerPoint, allowing participants to see the sponsors' information within the duration of the conference. In addition, conference organizers also need to present public information or notifications relevant to the meeting on short notice. However, whether it is information about the sponsors or routine information relevant to the meeting, this information is generally only stored in the organizer's own PowerPoint; other speakers cannot include this information, which is irrelevant to their statements. As a result, without interrupting the conferences' presentations, the supplementary information that's unrelated to their statements cannot be displayed on the big screen. If the meeting is interrupted to interject the supplementary information, or present the information at the end of the statement, the conference will be burdened with a necessary duration extension.

Therefore, a heretofore unaddressed need exists in the art to address the aforementioned deficiencies and inadequacies.

SUMMARY OF THE INVENTION

In order to solve the aforementioned technical issues, the present invention provides a method of and apparatus for simultaneously displaying the video input and the supplementary information.

In one aspect of the invention, the apparatus that simultaneously displays the video input and supplementary information includes a video overlay device, and a network management module, a removable storage device and a display device coupled to the video overlay device.

The network management module comprises a computer or a cloud server for uploading, via network, and controlling supplementary information. The video overlay device comprises a central processing unit, and a video input processing unit, a video output processing unit and local memory coupled to the central processing unit, wherein, under a control of the central processing unit, the supplementary information is obtained from the network management module, an email sent from the network management module, or removable storage devices, and is subsequently stored in the local memory, wherein the supplementary information comprises content information, layout information, and playback information; and In operation, a video input is converted by the video input processor device into an input digital signal that is subsequently stored within the local memory, wherein the input digital signal and the content information of the supplementary information read from the local memory is relayed to the video output module and superimposed according to the layout and playback information of the supplementary information, and wherein the superimposed digital signal is converted by the video output module into a video signal that is transmitted to the display device for display.

In one embodiment, the display device is a monitor or projector.

In one embodiment, the content information of the supplementary information includes texts; pictures; video clips; web materials, wherein the layout information of the supplementary information includes a display template and its reference number; wherein the playback information of the supplementary information includes a playing time, duration and frequency.

In one embodiment, the removable storage device comprises a portable hard drive, a USB disk, or an SD card.

In one embodiment, the local memory for the video overlay device includes FLASH and SDRAM.

In one embodiment, the video overlay device also includes video input interface for video input and a video output interface for connecting to display devices, the video input and output interfaces are HDMI, VGA,.

In one embodiment, the video overlay device also includes a network interface used to connect the network management module is at least one of Wi-Fi and Ethernet interface.

In one embodiment, the video input processing unit of the video overlay device includes a video capture card built into the central processing unit, or a separate external video capture card for the purpose of converting the video input analog signal into a digital signal and storing it in the local memory.

In one embodiment, the video output processing unit of the video overlay device includes a graphics card enbedded in the central processing unit, or a separate external graphics card for the purpose of overlaying, within the video output processing unit, the video input signal stored in local memory and sending the overlaid signal to the video output interface.

In another aspect of the invention, the method to simultaneously display the video input and supplementary information comprises the steps of:

Issuing a request for the supplementary information to a network management module, if the supplementary information of the network management module has been updated, downloading the updated supplementary information to a local memory;

Regularly scanning a removable storage device and checking if the removable storage device contains the updated supplementary information, and saving the updated supplementary information to the local memory;

reading an email from the network management module, obtaining the supplementary information from the email, and saving the obtained supplementary information to the local memory; and converting a video input to a digital signal by a video input processing unit and storing the converted digital signal in the local memory, transmitting content information of the supplementary information along with the video input digital signal retrieved from the local memory to the video output processing unit;

superimposing the input digital signal and the content information of the supplementary information according to layout and playback information of the supplementary information, and converting the superimposed digital signal into a video signal; and transmitting the video signal to a display device for display.

In one embodiment, the content information of the supplementary information includes texts; pictures; video clips; web materials, wherein the layout information of the supplementary information includes a display template and its reference number; wherein the playback information of the supplementary information includes a playing time, duration and frequency.

In one embodiment, when the video input is at 0, content of the supplementary information is shown in a display area of the video input; when the video input is not 0, it is shown according to one of display templates, the display templates include:

template 1: an image corresponding to the video input is at a screen center, an area above the image corresponding to the video input contains an image that corresponds to the supplementary information, wherein both images are of the same width and are aligned at both ends;

template 2: the image corresponding to the video input is at the screen center, an area below the image corresponding to the video input contains the image that corresponds to the supplementary information, wherein both images are of the same width and are aligned at both ends;

template 3: the top area contains the image corresponding to the content information of the supplementary information, and its width is equal to that of the entire screen, wherein the image corresponding to the video input at the screen center is located below the image corresponding to the supplementary information; and template 4: the bottom area contains the image corresponding to the content information of the supplementary information, and its width is equal to that of the entire screen, wherein the image corresponding to the video input at the screen center is located above the image corresponding to the supplementary information.

In one embodiment, the method also includes the step of obtaining statistics of the playback time, duration and frequency of the playback information, at the end of the supplementary information playback.

In one embodiment, the method also includes the steps of assigning, by the network management module, a separate user account for each user using the video overlay device, wherein each user is able to, through his or her own account number and password, access the video overlay device's ID, MAC address, IP address, online availability, and edit the informational content, layout information, and playback information.

In one embodiment, the method also includes the steps of adaptively displaying in an event of video input switching, which includes periodically checking resolution and frame rate of the video input, when a change in the resolution and frame rate is detected, keeping the resolution to enable the adaptively displaying in the event of video input switching.

Among other things, the present invention has the following advantages when compared to current technologies:

The present invention utilizes a network management module or a removable storage device to input the supplementary information to be displayed simultaneously to the video overlay device. The supplementary information and video input are overlaid using the input control module of the video overlay device, thus enabling the simultaneous display of the supplementary information and video input. The present invention can not only download supplementary information through the network as well as receive supplementary information through e-mail, but also input supplementary information from removable storage devices. Usage of the present invention results in displaying the supplementary information and video input not affecting each other, and can be displayed in multiple overlay mode. When the video input is at 0, the informational content of the supplementary information is shown in the display area of the video input. When the video input is not at 0, it will be shown according to the display templates, and can control and obtain statistics of the playback time, duration, and frequency. In addition, by monitoring the change in the video resolution and frame rate obtained from the input interface, adaptive display in the event of video input switching can be achieved.

These and other aspects of the present invention will become apparent from the following description of the embodiment taken in conjunction with the following drawings, although variations and modifications therein may be affected without departing from the spirit and scope of the novel concepts of the present invention.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment.

Figure 2:
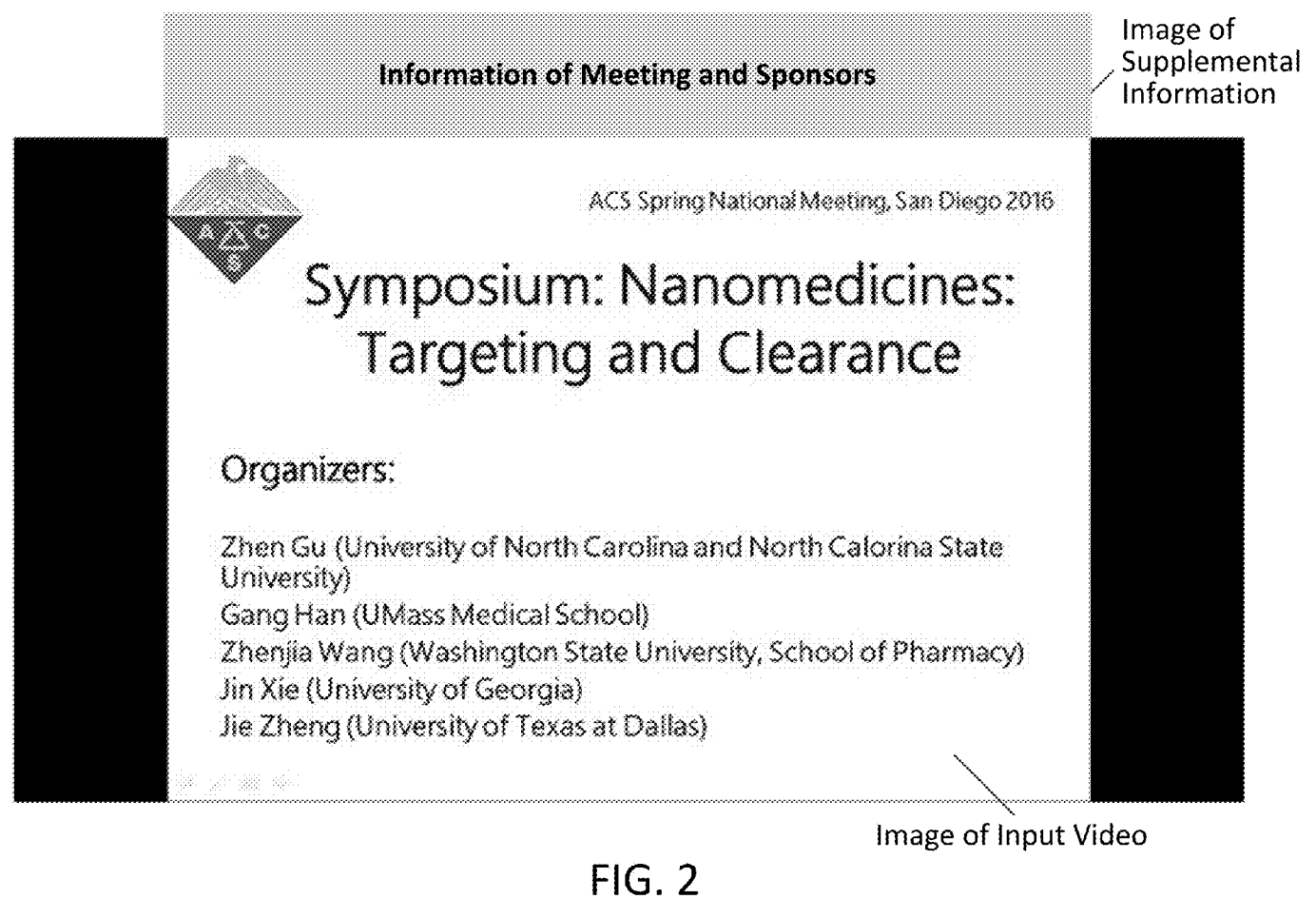

FIG. 2 is a schematic diagram of Template 1, according to one embodiment of the present invention.

DETAILED DESCRIPTION OF THE INVENTION

Figure 1:
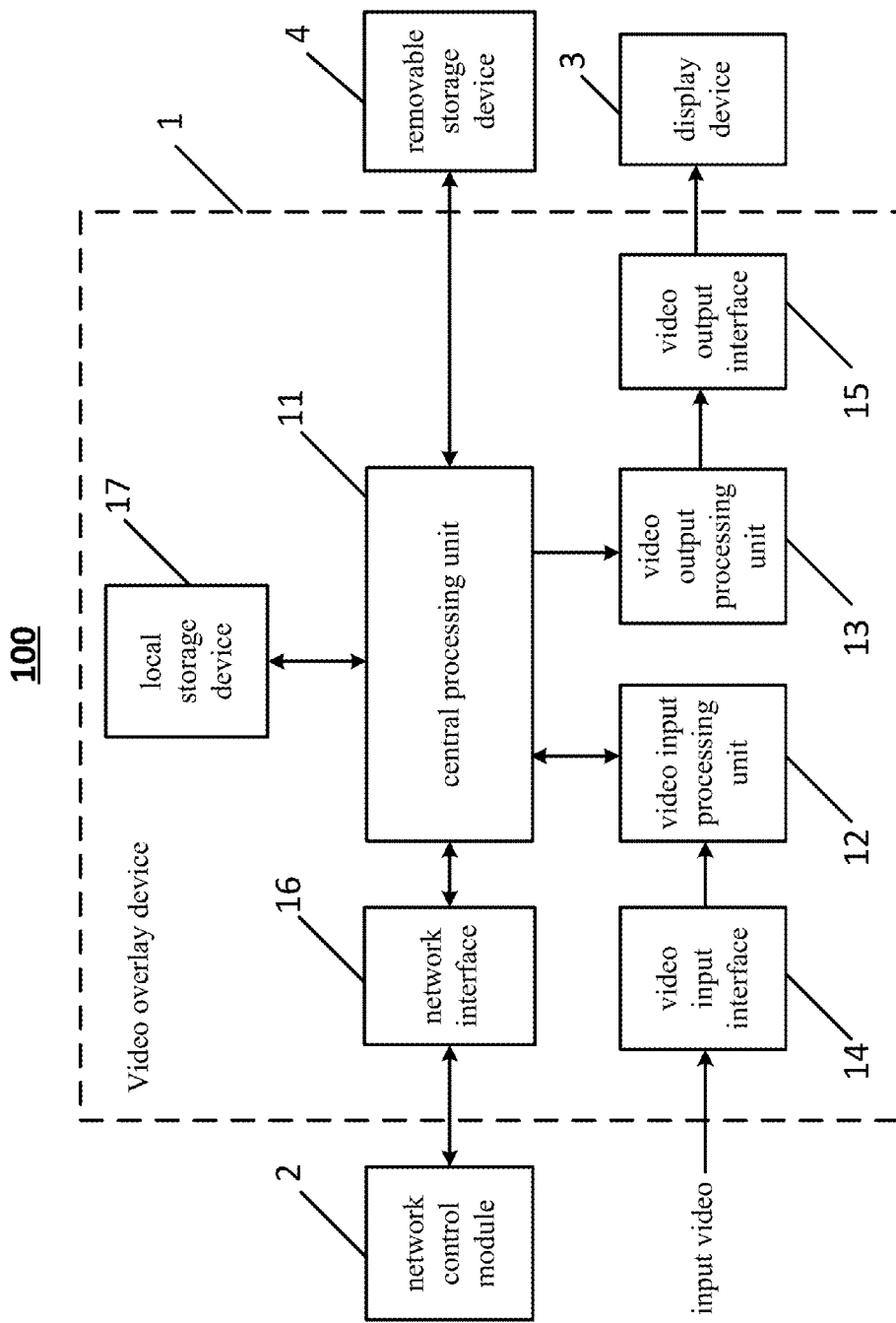
FIG. 1 shows a block diagram of the apparatus enabling the simultaneous display of the supplementary information and video input, according to one embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this disclosure generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in the disclosure, including examples of any terms discussed herein, is illustrative only, and in no way limits the scope and meaning of the disclosure or of any exemplified term. Likewise, the disclosure is not limited to various embodiments given in the disclosure. As used in the disclosure herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed as a second element, component, region, layer or section without departing from the teachings of the present invention.

It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

The term "module" or "unit", as used in the disclosure, may be exchangeable and refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor. Each of the modules can operate individually and independently of other modules. Some or all of the modules can be executed on the same server or terminal. Some or all of the modules can be combined as one module. A single module can also be divided into sub-modules, each sub-module performing separate method step or method steps of the single module. The modules can share access to a memory space. One module can access data accessed by or transformed by another module. The modules can be considered "coupled" to one another if they share a physical connection or a virtual connection, directly or indirectly, allowing data accessed or modified from one module to be accessed in another module.

The description will be made as to the embodiments of the present invention in conjunction with the accompanying drawings.

Referring to FIG. 1, an apparatus 100 to simultaneously display video input and supplementary information is shown according to one embodiment of the present invention. In this embodiments, the apparatus 100 includes a video overlay device 1, and a network management module 2, a removable storage device 3 and a display device 4 connected to the video overlay device 1. The network management module 2 comprises a computer or a cloud server for uploading, via network, and controlling supplementary information. The video overlay device 1 has a central processing unit 11, and a video input processing unit 12, a video output processing unit 13 and a local memory 17 connected to the central processing unit 11.

The supplementary information is stored in the local memory 17 after obtaining the supplementary information from the network management module 2, emails sent from the network management module 2, or the removable storage device 3.

In operation, the video input processing unit 12 converts a video input to a digital signal that is subsequently stores it in the local memory 17. Later, the digital signal and content information of the supplementary information are relayed from the local memory 17 to the video output processing unit 13. They are overlaid (superimposed) according to the layout and playback information contained within the supplementary information. The video output processing unit 13 transforms the digital signal to a video signal and transmits it to the display device 4 for display.

The display device 4 is a monitor (LCD or LED display) or projector.

The content information of the supplementary information includes texts; pictures; video clips; web materials, wherein the layout information of the supplementary information includes a display template and its reference number; wherein the playback information of the supplementary information includes a playing time, duration and frequency.

The removable storage device 3 is a portable hard drive, USB drive, or SD card.

The local memory 17 of the video overlay device 1 is FLASH, SDRAM.

The video overlay device 1 also includes a video input interface for video input and a video output interface for connecting to display devices. The video input and output interfaces are HDMI, VGA, The video overlay device 1 also includes a network interface that's used to connect the network management module. This interface is a Wi-Fi and/or Ethernet card.

The video output processing unit 13 of the video overlay device 1 includes a graphics card build into the central processing unit 11, or a separate external graphics card. Within the video output processing unit 13, the video input signal stored in local memory 17 and the supplementary information are overlaid, and the overlaid signal is relayed to video output interface 15.

The invention also relates to a method for simultaneously displaying a video input along with supplementary information. In one embodiment, the method includes the following steps.

Issuing a request for the supplementary information to a network management module, if the supplementary information of the network management module has been updated, downloading the updated supplementary information to a local memory.

The present invention's first and foremost method to obtain the supplementary information is to download the supplementary information via the network. The requested parameters include the device ID of the video overlay device; the network management module sends the supplementary information according to the device ID.

Regularly scanning a removable storage device and checking if the removable storage device contains the updated supplementary information, and saving the updated supplementary information to the local memory.

The second method to obtain the supplementary information is to directly read the supplementary information from a removable storage device directly plugged into the video overlay device. When scanning the removable storage device, it is necessary to verify whether its device ID is the same as that for local memory, and additionally checking the completeness of the content. If the content is complete and device ID is unchanged, the updated supplementary information will be saved locally.

Reading an email from the network management module, obtaining the supplementary information from the email, and saving the obtained supplementary information to the local memory.

The third method to obtain the supplementary information is through email. Using this method, the supplementary information can be obtained without logging on. The network management module assigns a designated email address for each video overlay device, through sending the supplementary information to the specific email address corresponding to each video overlay device; the central processing unit of the video overlay device can obtain the supplementary information by reading said emails.

After converting a video input to a digital signal by a video input processing unit and storing the converted digital signal in the local memory, transmitting content information of the supplementary information along with the video input digital signal retrieved from the local memory to the video output processing unit; superimposing the input digital signal and the content information of the supplementary information according to layout and playback information of the supplementary information, and converting the superimposed digital signal into a video signal; and transmitting the video signal to a display device for display.

The content information of the supplementary information includes texts; pictures; video clips; web materials, wherein the layout information of the supplementary information includes a display template and its reference number; wherein the playback information of the supplementary information includes a playing time, duration and frequency.

When the video input is at 0, content of the supplementary information is shown in a display area of the video input; when the video input is not 0, it is shown according to one of the following display templates.

Template 1: an image corresponding to the video input is at a screen center, an area above the image corresponding to the video input contains an image that corresponds to the supplementary information, wherein both images are of the same width and are aligned at both ends;

Below, an example is shown where template 1 simultaneously displays both the conference speakers' PowerPoint slideshow (video input) as well as the sponsors' information, as shown on FIG. 2.

The resolution is 1920×1080; the unit is pixels. The detailed settings are: width to height ratio for the PowerPoint slideshow is 4:3, width×height is 1440×1080, and both left and right ends consist of empty 240 pixel black borders.

In the template, 1600×900 is used as the dimensions (width×height) of the original video input area; that is the size of the whole screen. Keep the width×height ratio of the input constant, and shift the original video's X axis in the template 160 pixels to the left in order to horizontally center the original video.

The width×height of the PowerPoint video output is 1200×900 (4:3); thus, both edges of right and left ends consist of empty 200 pixel black borders.

The text area shows the conference's title; the font size is 40; it can be show in two lines; the X-coordinates is 360 (160+200) . In order to ensure alignment with the left edge of PPT, the width×height is 960×120 and the Y-coordinates is 2.

The width×height ratio of sponsors' logo is 240×120, x-axis is 1320. In order to ensure alignment with the right edge of PPT, the Y-coordinates is 2. The original video's Y-coordinates is 125.

In the vertical direction, the image height corresponding to the supplementary information can be adjusted within the range of 0-180 pixels, in order to prevent overlapping with PPT in the vertical direction.

Template 2: the image corresponding to the video input is at the screen center, an area below the image corresponding to the video input contains the image that corresponds to the supplementary information, wherein both images are of the same width and are aligned at both ends;

Template 3: the top area contains the image corresponding to the content information of the supplementary information, and its width is equal to that of the entire screen, wherein the image corresponding to the video input at the screen center is located below the image corresponding to the supplementary information; and Template 4: the bottom area contains the image corresponding to the content information of the supplementary information, and its width is equal to that of the entire screen, wherein the image corresponding to the video input at the screen center is located above the image corresponding to the supplementary information.

The method also includes the steps of obtaining statistics of the playback time, duration and frequency of the playback information, at the end of the supplementary information playback.

The methods also include the steps of assigning, by the network management module, a separate user account for each user using the video overlay device, wherein each user is able to, through his or her own account number and password, access the video overlay device's ID, MAC address, IP address, online availability, and edit the informational content, layout information, and playback information.

The methods also include the steps of adaptively displaying in an event of video input switching, which includes periodically checking resolution and frame rate of the video input, when a change in the resolution and frame rate is detected, keeping the resolution to enable the adaptively displaying in the event of video input switching.

The steps of the method or algorithm according to the embodiments disclosed in this specification can be implemented by hardware or a software module executed by a processor, or implemented by a combination thereof. The software module may be stored in a random access memory (RAM), a memory, a read-only memory (ROM), an electrically programmable ROM, an electrically erasable programmable ROM, a register, a hard disk, a removable magnetic disk, a CD-ROM, or any other type of non-transitory computer readable recoding medium commonly known in the art The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An apparatus for simultaneously displaying a video input along with supplementary information, comprising:
    a video overlay device, and a network management module, a removable storage device and a display device coupled to the video overlay device,
    wherein the network management module comprises a computer or a cloud server for uploading, via network, and controlling supplementary information;
    wherein the video overlay device comprises a central processing unit, and a video input processing unit, a video output processing unit and local memory coupled to the central processing unit, wherein, under a control of the central processing unit, the supplementary information is obtained from the network management module, an email sent from the network management module, or removable storage devices, and is subsequently stored in the local memory, wherein the supplementary information comprises content information, layout information, and playback information; and
    wherein in operation, a video input is converted by the video input processor device into an input digital signal that is subsequently stored within the local memory, wherein the input digital signal and the content information of the supplementary information read from the local memory is relayed to the video output module and superimposed according to the layout and playback information of the supplementary information, and wherein the superimposed digital signal is converted by the video output module into a video signal that is transmitted to the display device for display.

2. The apparatus of claim 1, wherein the display device is a display or projector.

3. The apparatus of claim 1, wherein the content information of the supplementary information includes texts; pictures; video clips; web materials, wherein the layout information of the supplementary information includes a display template and its reference number; wherein the playback information of the supplementary information includes a playing time, duration and frequency.

4. The apparatus of claim 1, wherein the removable storage device comprises a portable hard drive, a USB disk, or an SD card.

5. The apparatus of claim 1, wherein the local memory comprises FLASH or SDRAM.

6. The apparatus of claim 1, further comprising video input and output interfaces including at least one of HDMI, VGA, and USB port.

7. The apparatus of claim 1, wherein a network interface used to connect the network management module is at least one of Wi-Fi and Ethernet interface.

8. The apparatus of claim 1, wherein the video input processing unit of the video overlay device comprises a video capture card built into the central processing unit, or a separate external video capture card.

9. The apparatus of claim 1, wherein the video output processing unit of the video overlay device comprises a video capture card built into the central processing unit, or a separate external video capture card.

10. A method for simultaneously displaying a video input along with supplementary information, comprising:
    issuing a request for the supplementary information to a network management module, if the supplementary information of the network management module has been updated, downloading the updated supplementary information to a local memory;
    regularly scanning a removable storage device and checking if the removable storage device contains the updated supplementary information, and saving the updated supplementary information to the local memory;
    reading an email from the network management module, obtaining the supplementary information from the email, and saving the obtained supplementary information to the local memory; and
    converting a video input to a digital signal by a video input processing unit and storing the converted digital signal in the local memory, transmitting content information of the supplementary information along with the video input digital signal retrieved from the local memory to the video output processing unit;
    superimposing the input digital signal and the content information of the supplementary information according to layout and playback information of the supplementary information, and converting the superimposed digital signal into a video signal; and
    transmitting the video signal to a display device for display.

11. The method of claim 10, wherein the content information of the supplementary information includes texts; pictures; video clips; web materials, wherein the layout information of the supplementary information includes a display template and its reference number; wherein the playback information of the supplementary information includes a playing time, duration and frequency.

12. The method of claim 11, wherein when the video input is at 0, content of the supplementary information is shown in a display area of the video input; when the video input is not 0, it is shown according to one of display templates, the display templates include:
    template 1: an image corresponding to the video input is at a screen center, an area above the image corresponding to the video input contains an image that corresponds to the supplementary information, wherein both images are of the same width and are aligned at both ends;

template 2: the image corresponding to the video input is at the screen center, an area below the image corresponding to the video input contains the image that corresponds to the supplementary information, wherein both images are of the same width and are aligned at both ends;

template 3: the top area contains the image corresponding to the content information of the supplementary information, and its width is equal to that of the entire screen, wherein the image corresponding to the video input at the screen center is located below the image corresponding to the supplementary information; and template 4: the bottom area contains the image corresponding to the content information of the supplementary information, and its width is equal to that of the entire screen, wherein the image corresponding to the video input at the screen center is located above the image corresponding to the supplementary information.

13. The method of claim 11, further comprising obtaining statistics of the playback time, duration and frequency of the playback information, at the end of the supplementary information playback.

14. The method of claim 10, further comprising assigning, by the network management module, a separate user account for each user using the video overlay device, wherein each user is able to, through his or her own account number and password, access the video overlay device's ID, MAC address, IP address, online availability, and edit the informational content, layout information, and playback information.

15. The method of claim 10, further comprising adaptively displaying in an event of video input switching, which includes periodically checking resolution and frame rate of the video input, when a change in the resolution and frame rate is detected, keeping the resolution to enable the adaptively displaying in the event of video input switching.

* * * * *